(12) United States Patent
Takase

(10) Patent No.: US 6,669,354 B2
(45) Date of Patent: Dec. 30, 2003

(54) LIGHT SOURCE APPARATUS

(75) Inventor: Yoshiyuki Takase, Saitama (JP)

(73) Assignee: Fuji Photo Optical Co. Ltd., Saitama (JP)

( * ) Notice: Subject to any disclaimer, the term of this patent is extended or adjusted under 35 U.S.C. 154(b) by 0 days.

(21) Appl. No.: 10/105,401

(22) Filed: Mar. 26, 2002

(65) Prior Publication Data

US 2002/0141186 A1 Oct. 3, 2002

(30) Foreign Application Priority Data

Mar. 27, 2001 (JP) ........................................ 2001-090967

(51) Int. Cl.[7] .............................................. F21V 29/00
(52) U.S. Cl. ........................ 362/277; 362/268; 362/319; 362/455; 359/201; 359/641
(58) Field of Search .................................. 362/268, 277, 362/319, 455, 280, 321, 259; 359/201, 641

(56) References Cited

U.S. PATENT DOCUMENTS

| 4,697,880 | A | * | 10/1987 | Angerstein et al. | ......... 362/259 |
| 5,418,700 | A | * | 5/1995 | Demeritt et al. | ............ 362/259 |
| 2002/0048171 | A1 | * | 4/2002 | Nishiyama et al. | ......... 362/259 |

FOREIGN PATENT DOCUMENTS

JP          A 5-129729          5/1993

* cited by examiner

Primary Examiner—Sandra O'Shea
Assistant Examiner—James W Cranson, Jr.
(74) Attorney, Agent, or Firm—Oliff & Berridge, PLC

(57) ABSTRACT

A light source apparatus comprises a light source and a collimating lens for adjusting a luminous flux from the light source. The light source is supported by a holder made of a steel plate, a supporting member made of a steel plate is supported by the holder so as to slide in a direction of an optical axis to the collimating lens, and the collimating lens is supported by the supporting member.

12 Claims, 3 Drawing Sheets

LIGHT SOURCE APPARATUS

BACKGROUND OF THE INVENTION

1. Field of the Invention

The present invention relates to a light source apparatus for a laser scanning optical system in a copying machine, a laser printer or the like. In particular, the invention relates to a technique for enabling adjustment of a distance between a light source and a collimating lens with a low-cost structure.

2. Related Art

Conventionally, in a copying machine, a printer, and the like, a laser beam is provided for scanning and forming an image. FIG. 7 shows one example of a laser scanning optical system to be used in a conventional copying machine or the like. In the laser scanning optical system shown in this drawing, a laser beam 2, emitted from a light source 1 such as a laser diode, is transmitted through a collimating lens 3 so as to be formed into a parallel light beam and is formed into a linear spot by a cylindrical lens 4 so as to enter a rotatable polyhedral mirror 5. The laser beam 2 which is deflected by the rotatable polyhedral mirror 5 is transmitted through an f·θ lens 6 and forms an image on a scanning surface 7.

In order to maintain an emitted luminous flux, the distance between the light source and the collimating lens should be determined precisely. For this reason, the light source and the collimating lens are joined by a holding member such as a holder so as to be positioned and held. However, in such a structure, there arises a problem in that the holding member for joining the light source and the collimating lens undergoes thermal expansion due to a change in ambient temperature such as due to heat generated from a motor for driving a rotatable polyhedral mirror to be arranged in the vicinity of the holding member, heat generated from an electric circuit inside an apparatus such as a printer or a copying machine into which the light source apparatus is incorporated, a change in external temperature due to heat generated from the light source, and the distance between the light source and the collimating lens changes, and thus, the emitted luminous flux cannot be maintained in parallel and a defocusing occurs at the scanning surface. Therefore, particularly in a high-magnification laser scanning optical system, it is desirable that, in order to prevent the defocusing, the holding member for the light source and the collimating lens be composed of a material having a small linear expansion coefficient and that the distance between them can be adjusted.

Japanese Patent Application Laid-Open No. 5-129729 (1993) discloses a light source apparatus in which a collimating lens is fixed to an inside of a cylindrical mirror body, the mirror body is inserted into a cylindrical holder, and a laser diode is attached to a base section of the holder. In this light source apparatus, the mirror body is moved to a direction of an axial line so that the distance between the laser diode and the collimating lens is adjusted and after the adjustment is ended, the mirror body is fixed to the holder. The holder is generally made of a material such as an iron type sintered alloy having a small linear expansion coefficient so that the defocusing in use is suppressed.

However, when the holder and the mirror body are made of a sintered alloy so as to have a cylindrical shape, there arises a problem in that the cost of materials and the processing cost increase, and the cost of production becomes high.

SUMMARY OF THE INVENTION

It is an object of the present invention to provide a light source apparatus which is capable of adjusting a distance between a light source and a collimating lens with a low-cost structure.

The present invention provides a light source apparatus of the present invention, including a light source and a collimating lens for adjusting a luminous flux from the light source. The light source being supported by a holder made of a steel plate, a supporting member made of a steel plate is supported by the holder so as to slide in a direction of an optical axis of the collimating lens, and the collimating lens is supported by the supporting member.

In the light source apparatus having the above structure, since the supporting member which slides in the direction of the optical axis with respect to the holder supports the collimating lens, the supporting member is slid in the direction of the optical axis so that a distance between the light source and the collimating lens can be adjusted. Moreover, since the holder and the supporting member are made of a low-cost steel plate having a small linear expansion coefficient, a defocusing due to a change of temperature can be suppressed, and the production cost can be reduced. Moreover, when a mirror body is supported directly by the holder, it is necessary for sliding the mirror body with it being kept in a parallel orientation to secure a certain length of the mirror body. As a result, it is necessary to prepare a mirror body which is long in comparison with the overall length of the collimating lens to be held in the direction of the optical axis. However, in the present invention, since the supporting member for supporting the collimating lens is slid with respect to the holder, even if the mirror body is shortened, no problems arise.

Means for sliding the supporting member in the direction of the optical axis can be composed of an adjustment tool having a cam, a cam shaft, and a rotation operating section. In this case, a slot which extends in a direction substantially intersecting perpendicularly to the optical axis and into which the cam is housed is provided on the supporting member, and a hole into which the cam shaft is fitted inside the slot is provided to the holder. In this structure, when the adjustment tool is rotated, the cam urges the inner peripheral wall of the slot so as to move the supporting member in the direction of the optical axis. Alternatively, a screw is supported by one of the holder or the supporting member rotatably, and an end portion of the screw is screwed into the other one, and the cam is provided to a portion which contacts with the other member at a head portion of the screw.

The collimating lens can be supported directly by the supporting member. However, the collimating lens is fixed to the cylindrical mirror body and the mirror body is supported to the supporting member so that the structure can be more stable. In this case, the structure is simplified by forming a rectangular notch on the supporting member and supporting the outer peripheral surface of the mirror body by both edge portions of the notch. It is desirable to tighten and support the mirror body and the collimating lens elastically to the supporting member, and this suppresses displacement of the mirror body and the like due to oscillation. For example, it is preferable that a plate spring be formed into a gate shape and that both its end portions be fixed to the supporting member by screws, and a center portion of the plate spring be deformed elastically so that the mirror body and the like is tightened to the supporting member.

The holder and the supporting member can be formed by sheet-metal working, and as a material therefor, a cold-rolled material (normal steel plate) or a processed steel plate which was subject to plating can be used. The holder is bent perpendicularly at the time of sheet-metal working and the bent portion is used as the supporting portion of the light source so that the structure can be simplified. Moreover, a structure in which the supporting member is guided with respect to the holder can be formed easily by the sheet-metal working. For example, a plurality of slots which extend to the direction of the optical axis can be formed in the supporting member, and pins which slidably contact with the slots may be provided to the holder. In this case, the pins may be pressed into holes formed in the holder, or the pins may be formed integrally with the holder by fine blanking. Alternatively, a concave section which extends in the direction of the optical axis is formed in one of the holder and the supporting member, and a convex section which slidably contacts with the concave section can be formed in the other one. Such working can also be carried out easily by fine blanking.

The supporting member can be constituted so as to be moved to a direction intersecting perpendicularly to the optical axis (lateral direction). In this case, a slot which extends in the direction of the optical axis and in which the cam is housed is provided to the holder, and a hole into which the cam shaft is fitted may be formed in a frame of a copying machine, for example, to which the light source apparatus of the present invention is attached.

DETAILED DESCRIPTION OF THE PREFERRED EMBODIMENT

A. Structure of the Embodiment

Figure 1:
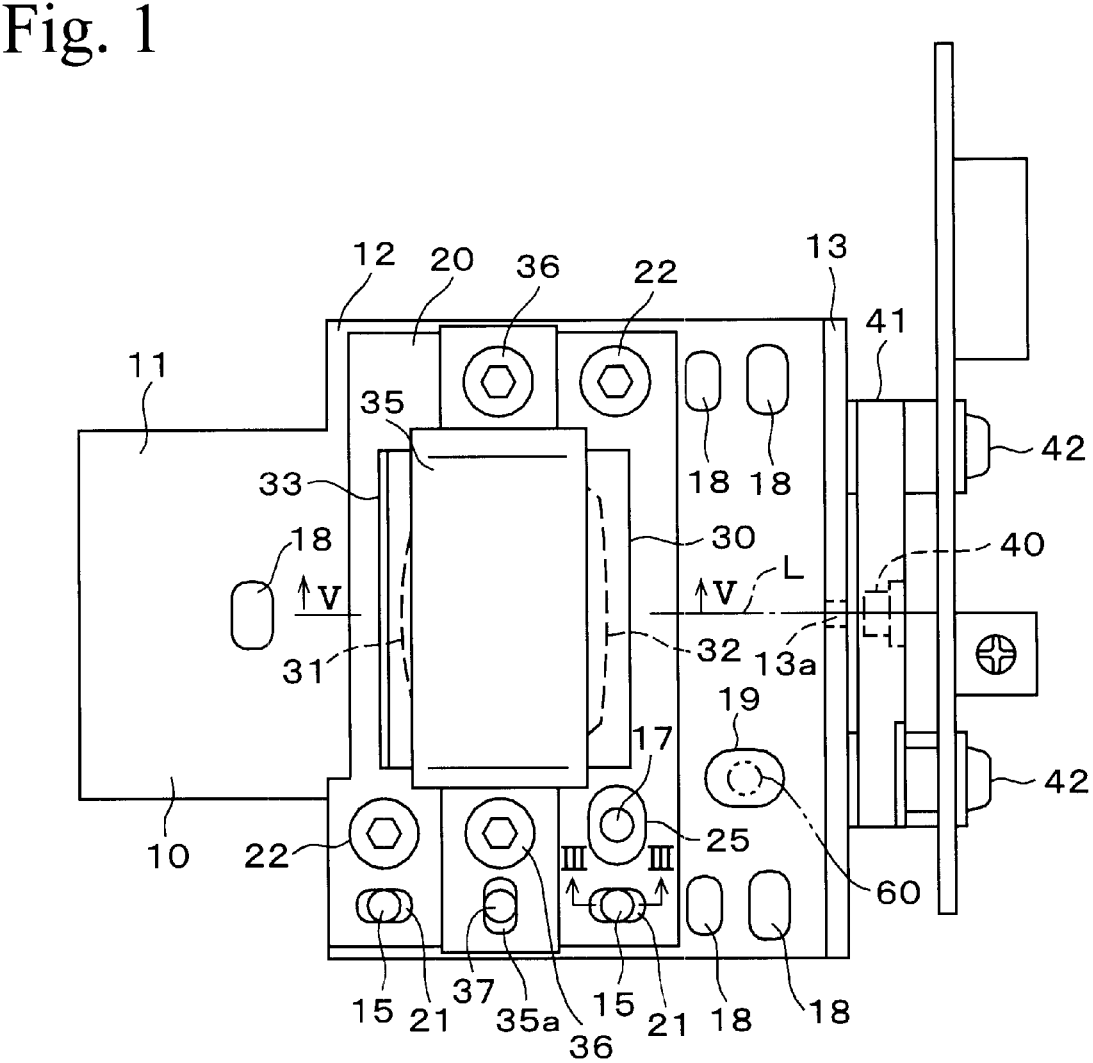
FIG. 1 is a plan view showing a light source apparatus according to an embodiment of the present invention.
Figure 2:
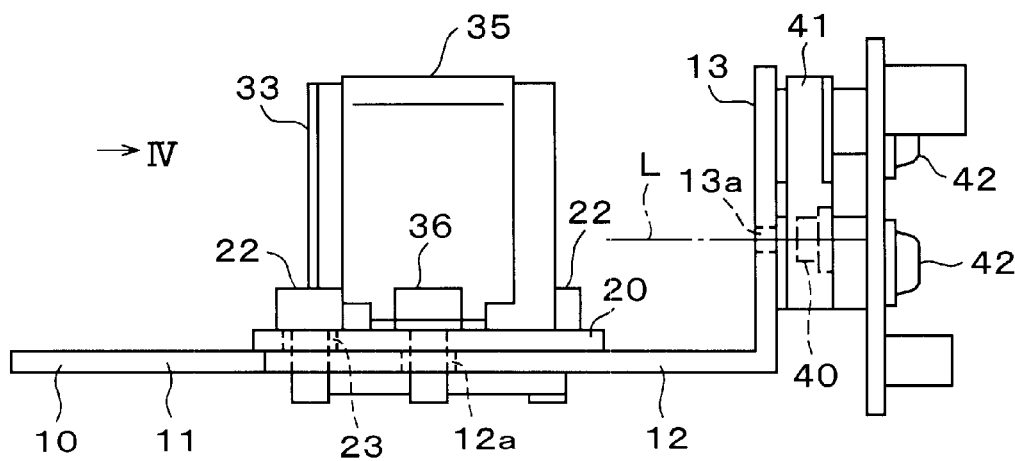
FIG. 2 is a side view showing the light source apparatus according to the embodiment of the present invention.
Figure 3:
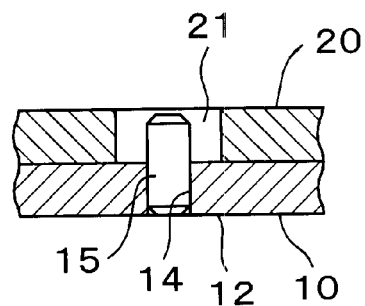
FIG. 3 is a cross sectional view taken along line III—III of FIG. 1.

An embodiment of the present invention will be explained below with reference to FIGS. 1 through 6. In FIGS. 1 and 2, a laser beam is emitted to a left side in the drawing. In the following explanation, a side from which the laser beam is emitted is a front end side, and this defines front-and-rear and right-and-left directions. In these drawings, reference numeral 10 is a holder (supporting member), 30 is a mirror body (collimating lens) and 40 is a laser diode (light source). The holder 10 is obtained by bending a processed steel plate perpendicularly into an approximately L-shape from a side view. A front end portion of the holder 10 is formed with a lens supporting section 11 for supporting a cylindrical lens, its center portion is formed with a main body section 12, and its rear end portion which is bent into an L-shape is formed with a light source supporting section 13. As shown in FIG. 3, two holes 14 arranged in an optically axial direction (FIG. 3 shows only one) are formed in a left side of the main body section 12, and a guide pin 15 is pressed into each hole 14.

Figure 4:
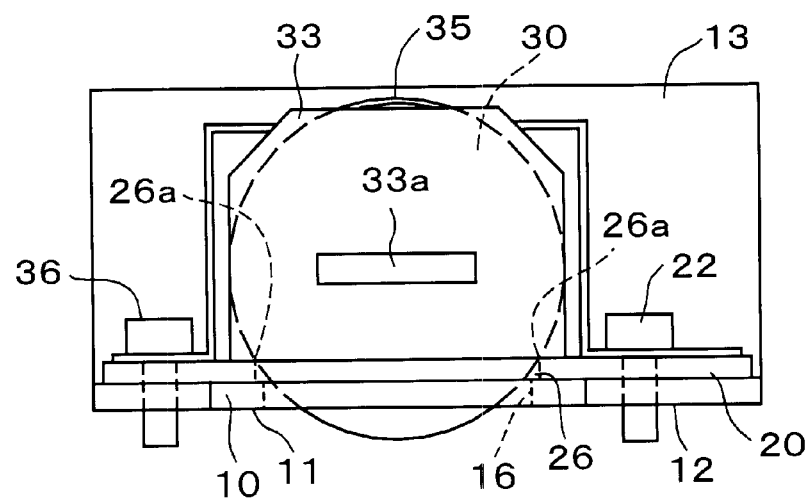
FIG. 4 is a partial view taken in the direction of the arrow IV of FIG. 2.
Figure 5:
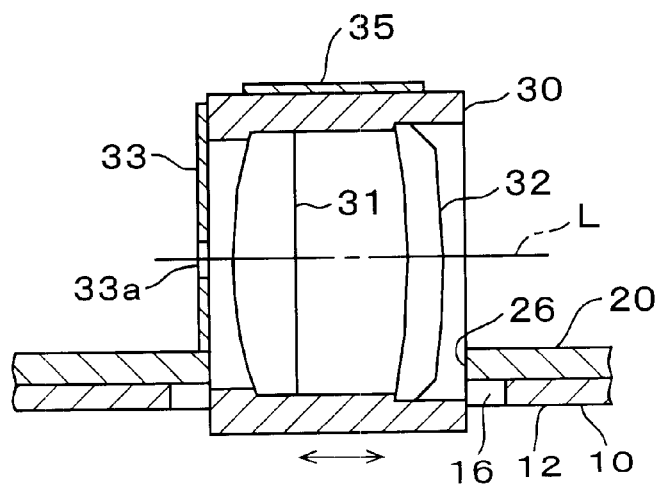
FIG. 5 is a cross sectional view taken along line V—V of FIG. 1.

As shown in FIGS. 4 and 5, a rectangular notch 16 for avoiding the mirror body 30 is formed in the main body section 12. Moreover, the main body section 12 is formed with a hole 17 into which a cam shaft 53 of an adjustment tool 50 (described below) is fitted. Reference numeral 18 in the drawings is an attachment hole for attaching this optical apparatus to a frame of a copying machine, for example. Moreover, reference numeral 19 is a slot which extends to a direction of an optical axis L and adjusts a position of the holder 10 to a right-and-left direction with respect to the optical apparatus, and a function of the slot 19 will be described below.

A supporting plate 20 is supported by the main body section 12 of the holder 10. The supporting plate 20 is obtained by molding a processed steel plate into a rectangular shape, and slots 21 which extend in the direction of the optical axis L are formed in a left side of the supporting plate 20. The above-mentioned guide pins 15 are fitted respectively into the slots 21, and the supporting plate 20 supports it so as to slide parallel to the direction of the optical axis L. The supporting plate 20 is attached to the holder 10 by two bolts 22 arranged at diagonal positions. Portions through which the bolts 22 of the supporting plate 20 pierce serve as slots 23 which extend in the direction of the optical axis L so that the supporting plate 20 can slide along a predetermined distance in the direction of the optical axis L.

The supporting plate 20 is formed with a slot 25 which extends in the right-and-left direction, and the hole 17 of the holder 10 is arranged in the slot 25. Moreover, as shown in FIGS. 4 and 5, a rectangular notch 26 is formed in the center portion of the supporting plate 20, and a lower portion of the mirror body 30 is fitted into the notch 26. An outer peripheral surface of the mirror body 30 is supported by right and left upper edge portions 26a of the notch 26, thereby positioning the mirror body 30 in the right-and-left direction. The mirror body 30 has a cylindrical shape, and a collimating lenses 31 and 32 are fixed to a hollow portion of the mirror body 30. Furthermore, an aperture member 33 having an aperture 33a is fixed to a front surface of the mirror body 30. The aperture member 33 blocks unnecessary light from a laser beam transmitted through the collimating lenses 31 and 32.

The mirror body 30 is elastically tightened and fixed to the supporting plate 20 by a plate spring 35. The plate spring 35 has a gate shape from the front view, and its center portion at the upper end has an arc shape along the outer peripheral surface of the mirror body 30. Both end portions at the lower end of the plate spring 35 are bent so as to open in a horizontal direction, and this portion is attached to the supporting plate 20 by bolts 36. Portions through which the bolts 36 of the main body section 12 of the holder 10 pierce serve as a slot 12a so that the holder 10 can slide in the direction of the optical axis L (see FIG. 2). A slot 35a which extends in the right-and-left direction is formed in a left end portion of the plate spring 35, and a pin 37 which is pressed into the supporting plate 20 is fitted into the slot 35a. A slot (not shown) which extends in the right-and-left direction is formed also on the portions through which the bolts 36 of the plate spring 35 pierce. With this structure, one end portion of the plate spring 35 is moved to the right-and-left direction so that a tightening force of the mirror body 30 can be adjusted. At this time, since the slot 35a formed in one end portion of the plate spring 35 is guided by a pin 37, the plate spring 35 holds a posture which intersects perpendicularly to the optical axis L.

An LD holder 41 is attached to the light source supporting section 13 of the holder 10 by a screw 42, and a laser diode 40 is pressed into the LD holder 41. A hole 13a for allowing a laser beam to pass is formed in the light source supporting section 13.

B. Function of the Embodiment

There will be explained below a procedure for adjusting a distance between the collimating lenses 31 and 32 and the laser diode 40 ("collimating lens/LD distance") in the light source apparatus having the above structure. Firstly, the mirror body 30 is fitted into the notch 26 of the supporting plate 20. Next, the mirror body 30 is covered by the plate spring 35 and the bolts 36 are allowed to pierce respectively through both the end portions of the plate spring 35 so as to be tightened to the supporting plate 20. At this time, one end portion of the plate spring 35 is moved in the right-and-left direction so that the tightening force of the plate spring 35 with respect to the mirror body 30 is adjusted.

In order to fit each pin 15 into each slot 21, the supporting plate 20 is placed on the holder 10 and the bolts 22 are temporarily tightened. That is, the supporting plate 20 is set so as to be moved by pushing it in the direction of the optical axis L. In this state, the collimating lens/LD distance is adjusted by using the adjustment tool 50 as follows.

Figure 6A:
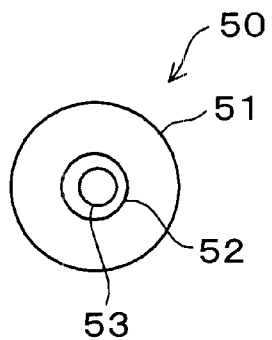
FIG. 6A is an underside view showing an adjustment tool.
Figure 6B:
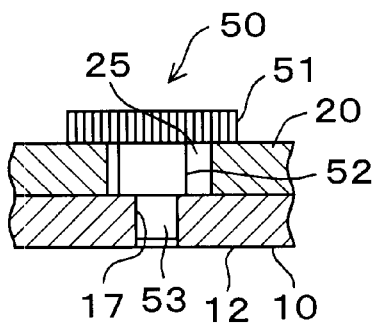
FIG. 6B is a side cross sectional view showing a state in which the adjustment tool is attached to the light source apparatus.
Figure 7:
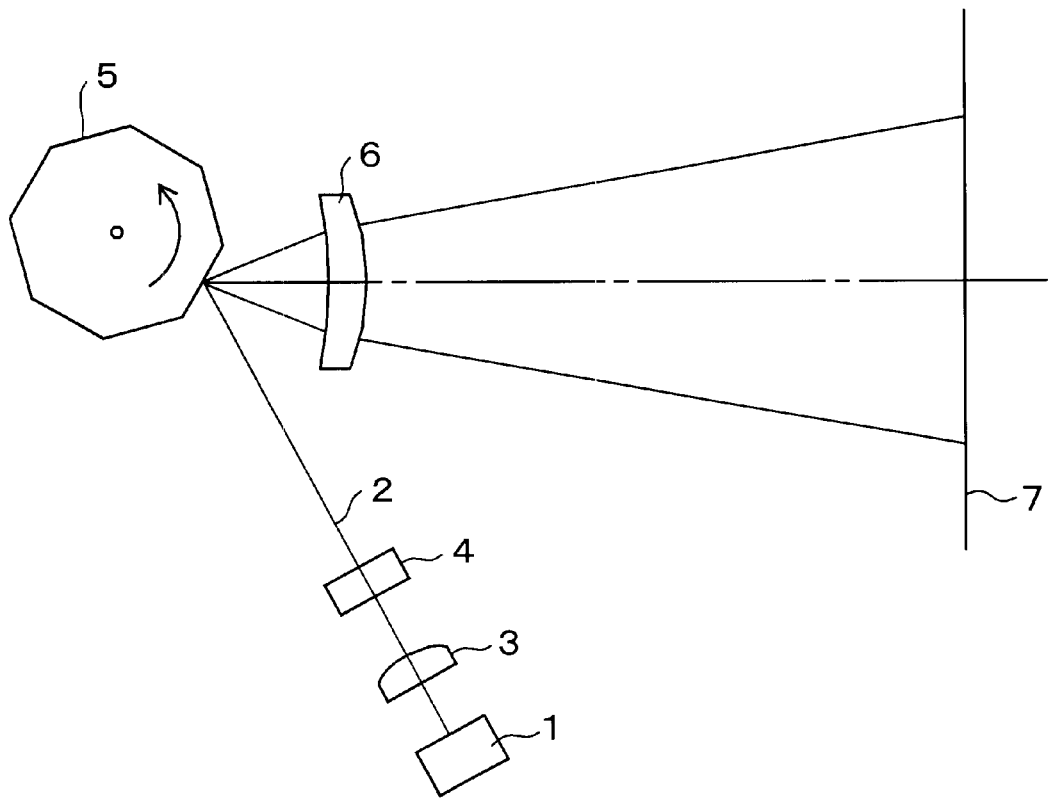
FIG. 7 is a schematic diagram showing a conventional laser scanning optical system.

FIG. 6 is a diagram showing the adjustment tool 50. The adjustment tool 50 is composed of a disc-shaped rotation operating section 51 formed with a serration on its outer peripheral portion, a disc-shaped cam 52 which is eccentric from the axial line of the rotation operating section 51, and a cam shaft 53 of which axial line matches with the rotation operating section 51. When the collimating lens/LD distance is adjusted, the cam 52 is housed in the slot 25 of the supporting plate 20 and the cam shaft 53 is fitted into the hole 17 of the holder 10 (see FIG. 6B). In this state, when the rotation operating section 51 is rotated, the cam 52 urges the inner peripheral surface of the slot 25 in a direction which intersects perpendicularly to the sheet surface of the drawing so that the supporting plate 20 slides in the direction of the optical axis L. The bolts 22 are tightened in a position where a laser beam emitted from the laser diode 40 is in focus so that the supporting plate 20 is fixed to the holder 10.

When the optical apparatus having the above structure is attached to a frame of a copying machine, for example, bolts are pushed through the attachment holes 18 of the holder 10 so as to be temporarily tightened to the frame. Similarly to the above, the cam 52 of the adjustment tool 50 is housed in the slot 19 of the holder 10 and the cam shaft 53 of the adjustment tool 50 is fitted into the hole 60 formed in the frame. In this state the rotation operating section 51 is rotated so that the inner peripheral surface of the slot 19 is pushed to the right-and-left direction by the cam 52, and the holder 10 moves to the right-and-left direction with respect to the frame of the copying machine.

In the optical apparatus having the above structure, the supporting plate 20 is slid in the direction of the optical axis L so that the collimating lens/LD distance can be adjusted. Moreover, since the holder 10 and the supporting plate 20 are made of a low-cost steel plate having a small linear expansion coefficient, defocusing due to the heat generated by the laser diode 40 can be suppressed, and the production cost can be reduced. Moreover, when the mirror body 30 is supported directly by the holder 20, it is necessary for sliding the mirror body 30 with it being kept in a parallel posture to secure a certain length, and a mirror body, which is long in comparison with the overall length of the collimating lenses 31 and 32 to be held in the direction of the optical axis L, should be prepared. However, since the supporting plate 20 is slid with respect to the holder 10 in the present invention, even if the mirror body 30 is shortened, no problems arise.

Particularly in the above embodiment, the slot 25 for housing the cam 52 of the adjustment tool 50 is formed in the supporting frame 20, and the hole 17 into which the cam shaft 53 is fitted in the slot 25 is formed in the holder 10, and the adjustment tool 50 is rotated so as to slide the supporting plate 20. For this reason, it is not necessary to provide additional parts to the holder 10 and the supporting plate 20, and the structure can be compact.

In addition, in the above embodiment, the rear end portion of the holder 10 is bent into an L-shape and the laser diode 40 is attached thereto, and all the processes, such that the slots 21 and 25 are formed in the supporting plate 20 and the supporting plate 20 is guided and moved, can be carried out by sheet-metal working. For this reason, the number of parts and the number of operations are reduced and the production cost can be further reduced. Furthermore, since the mirror body 30 is elastically tightened and fixed to the supporting plate by the plate spring 35, displacement of the mirror body 30 due to oscillation can be suppressed. In addition, in the present embodiment, the position of the optical apparatus in the right-and-left direction with respect to the frame of the copying machine or the like can be adjusted by an extremely simple structure composed of the slot 19 formed in the supporting plate 20 and the hole 60 formed in the frame.

What is claimed is:

1. A light source apparatus comprising;
a light source; and
a collimating lens for adjusting a luminous flux from the light source, wherein the light source is supported by a holder made of sheet metal, a supporting member made of sheet metal is supported by the holder so as to slide in a direction of an optical axis to the collimating lens, and the collimating lens is supported by the supporting member.

2. The light source apparatus according to claim 1, wherein a slot which extends to a direction substantially intersecting perpendicularly to the optical axis is provided on the supporting member, a hole which is disposed in an inside of the slot is provided to the holder, a cam shaft of an adjustment tool having a cam is fitted into the hole and the cam is housed in the slot, and in this state the adjustment tool is rotated so that the supporting member is moved in the direction of the optical axis.

3. The light source apparatus according to claim 2, wherein the supporting member is slid in a direction of the optical axis by an adjustment tool having a cam, a cam shaft, and a rotation operating section.

4. The light source apparatus according to claim 3, wherein a slot which extends in a direction substantially intersecting perpendicularly to the optical axis and into which the cam is housed is provided to the supporting member, and a hole into which the cam shaft is fitted inside the slot is provided to the holder.

5. The light source apparatus according to claim 4, wherein the collimating lens is fixed to the cylindrical mirror body, and the mirror body is supported to the supporting member.

6. The light source apparatus according to claim 5, wherein a rectangular notch is formed in the supporting member, and an outer peripheral surface of the mirror body is supported by both edge portions of the notch.

7. The light source apparatus according to claim 6, wherein the mirror body or the collimating lens is elastically tightened and supported to the supporting member.

8. The light source apparatus according to claim 7, wherein a gate-shaped plate spring is provided, and both end portions thereof are attached to the supporting member by a screw, and a center portion of the plate spring is deformed elastically so that the mirror body or the collimating lens is tightened to the supporting member.

9. The light source apparatus according to claim 1, wherein a plurality of slots which extend in a direction of the optical axis is formed in the supporting member, and pins which slidably contact with the slots are provided to the holder, so that the supporting member is guided with respect to the holder.

10. The light source apparatus according to claim 1, wherein a concave section which extends in a direction of the optical axis is formed in one of the holder and the supporting member, and a convex section which slidably contacts with the concave section is formed in the other one.

11. The light source apparatus according to claim 2, wherein the supporting member is slid in a direction intersecting perpendicularly to the optical axis by an adjustment tool having a cam, a cam shaft, and a rotation operating section.

12. The light source apparatus according to claim 11, wherein a slot which extends in a direction of the optical axis and in which the cam is housed is provided to the holder, and a hole into which the cam shaft is fitted is formed in a frame to which the light source apparatus is attached.

* * * * *